United States Patent
Guo

(10) Patent No.: US 9,619,359 B2
(45) Date of Patent: Apr. 11, 2017

(54) SERVER AND DEVICE FOR ANALYZING A SIGNAL THEREOF

(71) Applicants: INVENTEC (PUDONG) TECHNOLOGY CORPORATION, Shanghai (CN); INVENTEC CORPORATION, Taipei (TW)

(72) Inventor: Yuan-Hui Guo, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 338 days.

(21) Appl. No.: 14/452,516

(22) Filed: Aug. 5, 2014

(65) Prior Publication Data

US 2015/0370679 A1 Dec. 24, 2015

(30) Foreign Application Priority Data

Jun. 20, 2014 (CN) .......................... 2014 1 0276974

(51) Int. Cl.
*G06F 11/00* (2006.01)
*G06F 11/30* (2006.01)

(52) U.S. Cl.
CPC ...... *G06F 11/3034* (2013.01); *G06F 11/3093* (2013.01); *G06F 11/3055* (2013.01)

(58) Field of Classification Search
CPC ..... H05K 7/14–7/1494; G06F 11/3034; G06F 11/3093
See application file for complete search history.

(56) References Cited

U.S. PATENT DOCUMENTS

| 7,734,839 | B1 * | 6/2010 | Sivertsen | G06F 13/387 709/230 |
| 8,078,770 | B1 * | 12/2011 | Sivertsen | G06F 13/4282 710/19 |
| 8,830,611 | B1 * | 9/2014 | Chen | G06F 11/3034 360/31 |
| 2012/0133520 | A1 * | 5/2012 | Chang | G11B 33/10 340/635 |

FOREIGN PATENT DOCUMENTS

CN 102237125 A 11/2011

OTHER PUBLICATIONS

SC815 Chassis Series User's Manual, Super Micro Computer Inc., Nov. 15, 2006, Manual Revision 1.0.*
The SC818 Chassis Series User Guide, Super Micro Computer Inc., Mar. 20, 2006, Manual Revision 1.0.*
Storage Chassis 4-Port Mini-SAS Backplane User's Manual, Chenbro Micom Co., LTd., May 28, 2008, Version A2—A3.1.*

* cited by examiner

*Primary Examiner* — Michael Maskulinski
(74) *Attorney, Agent, or Firm* — Huffman Law Group, PC

(57) ABSTRACT

A server and a signal analyzing device thereof are disclosed. The server includes a plurality of hard disk drive (HDDs), a plurality of indicators, at least a jumper, and a logic array. The logic array is coupled to the at least one jumper and includes a plurality of analyzing modules. The logic array selects one of the analyzing modules in response to the at least one jumper. The selected analyzing module analyzes an input signal and outputs a decoded signal. The indicators show the states of the HDDs according to the decoded signal.

17 Claims, 2 Drawing Sheets

SERVER AND DEVICE FOR ANALYZING A SIGNAL THEREOF

CROSS-REFERENCE TO RELATED APPLICATIONS

This non-provisional application claims priority under 35 U.S.C. §119(a) on Patent Application No(s). 201410276974.2 filed in China on Jun. 20, 2014, the entire contents of which are hereby incorporated by reference.

BACKGROUND OF THE INVENTION

Technical Field of the Invention

The present disclosure relates to a server and a signal analyzing device thereof, and more particularly to a server with a signal analyzing device that is capable of analyzing multiple sets of input signals.

Description of the Related Art

The hardware techniques are maturing in days in accordance with the advancement of the modern technology. Many hardware devices can not only store and access data but also execute multiple different tasks. However, if the user wants to know the current executing functions or working status of the device externally, he still needs to check the signal lamp on the backplane to get the information related to the hardware.

But the traditional signal analyzing chip on the backplane can only analyze one set of input signals. Therefore, the user needs to replace the signal analyzing chip to analyze other sets of input signals if he wants to use the other sets of input signals. Since the signal analyzing chip is usually soldered on the backplane, if the user wants to replace the signal analyzing chip, he has to replace the whole backplane at the same time. Consequently, the replacement cost will be very burdensome to the user. More precisely, the chip on the backplane of the hard disk drive (HDD) analyzes the status of the connected HDD according to a serial general purpose input output (SGPIO) signal. Due to that the traditional signal analyzing chip can analyze only one set of SGPIO signals, it reduces versatility and increases inconvenience.

SUMMARY OF THE INVENTION

According to one or more embodiments, a server includes a plurality of HDDs, a plurality of indicators, at least a jumper, and a logic array. The logic array is coupled to the at least one jumper and includes a plurality of analyzing modules. The logic array selects one of the analyzing modules in response to the jumper. The selected analyzing module analyzes an input signal and outputs a decoded signal. The indicators display work states of the HDDs according to the decoded signal.

In one embodiment of the server, the server further includes a storage controller that is coupled to the HDDs and transmits the input signal to the logic array.

In one embodiment of the server, the server further includes a HDD backplane that is coupled with the HDDs, and the at least one jumper, the logic array, and the indicators are disposed on the HDD backplane.

In one embodiment of the server, the server further includes a mother board, a CPU, and an interposer board. The CPU is disposed on the mother board, and the storage controller is disposed on the interposer board. The interposer board is coupled between the mother board and the HDD backplane, and the storage controller is coupled between the CPU and the plurality of HDDs.

In one embodiment of the server, the amount of the at least one jumper is n, n is greater than or equal to 1, the jumpers produce less than or equal to $2^n$ sets of different jumper signals, and the amount of the analyzing modules is less than or equal to $2^n$.

According to one or more embodiments, a signal analyzing device includes at least a jumper and a logic array. The logic array includes a plurality of analyzing modules and selects one of the analyzing modules in response to the at least one jumper, and the selected analyzing module analyzes an input signal to produce a decoded signal.

BRIEF DESCRIPTION OF THE DRAWINGS

The present disclosure will become more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
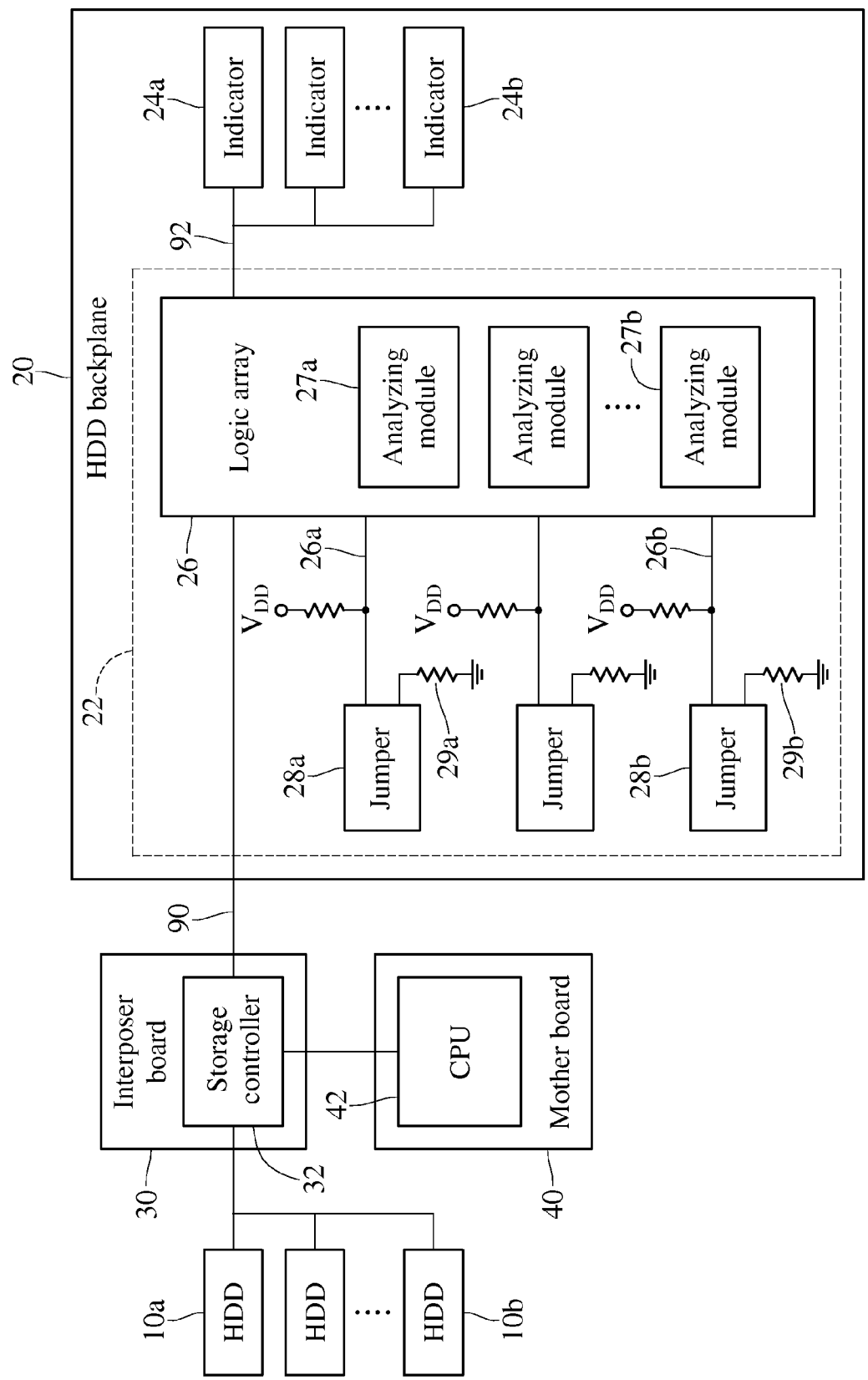
FIG. 1 is a functional block diagram of a server according to an embodiment of the present disclosure.

Please refer to FIG. 1. FIG. 1 is a functional block diagram of a server according to an embodiment of the present disclosure. The server comprises a plurality of HDDs 10a and 10b, a HDD backplane 20, an interposer board 30, and a mother board 40. The HDD 10a and 10b may be any storage media accessible to the computer.

The HDD backplane 20 comprises a signal analyzing device 22 and indicator 24a and 24b. The signal analyzing device 22 comprises a logic array 26 and at least a jumper (such as jumpers 28a and 28b. The logic array 26 is coupled with the jumpers 28a and 28b. The logic array 26 receives and analyzes an input signal 90 to produce a decoded signal 92 in response to at least one of the jumpers 28a and 28b, where the decoded signal 92 may be a parallel signal.

In one or more embodiments, the aforementioned logic array 26 may be a complex programmable logic device (CPLD) or any other device capable of analyzing signals.

The logic array 26 may comprise a plurality of analyzing modules 27a and 27b. The logic array 26 may select one of the analyzing modules 27a and 27b in response to at least one of the jumpers 28a and 28b. The selected analyzing module may analyze the input signal 90 to produce the decoded signal 92. The indicators 24a and 24b may display the working states of the HDDs 10a and 10b according to the decoded signal 92.

The input signal 90 may be but not limited to a serial general purpose input output (SGPIO) signal or general purpose input output (GPIO) signal from the HDDs 10a and 10b. Since the input signal 90 may carry the information of the HDDs' states, the analyzing modules 27a and 27b may extract the information of the HDDs' states from the input signal 90 to produce the decoded signal 92.

The jumpers 28a and 28b may cooperate with other electronic components to provide the input signal to the logic array 26. The electronic components may be but not limited to the resistors 29a and 29b. As shown in the figure, the jumpers 28a and 28b are constantly in the disconnected status and the jumpers 28a and 28b are connected when the cap is disposed on the jumpers 28a and 28b. The logic array 26 may select one of the analyzing modules 27a and 27b according to the configuration of at least one of the jumpers 28a and 28b or the jumper signal. The selected analyzing module may analyze the input signal 90 to produce the decoded signal 92. One configuration may correspond to one jumper signal.

The logic array 26 comprises at least a pin (such as pins 26a and 26b). The jumpers 28a and 28b) are connected to the pins 26a and 26b respectively. The connection states of the jumpers 28a and 28b may be used to control the logic levels of the pins 26a and 26b, so that the logic array 26 may select one of the analyzing modules 27a and 27b according to the logic level of the at least one of the pins 26a and 26b and the selected analyzing module may analyze the input signal 90 to produce the decoded signal 92.

Taking two jumpers 28a and 28b for an example, every jumper has two states (as referred to be the connection states): ON state and OFF state. When the jumpers 28a and 28b are in ON state, the pins 26a, 26b may be in logical low. When the jumpers 28a and 28b are in OFF state, the pins 26a and 26b are in logical high. According to the two states of every jumper, the two jumpers 28a and 28b may provide 4 configurations (or called jumper signals): 00, 01, 10, 11, representing in a logical expression. These four configurations may correspond to the analyzing modules 27a and 27b. In other words, two jumpers may pair up with 4 analyzing modules at most. Likewise, three jumpers may pair up with 8 ($2^3$) analyzing modules at most.

More precisely, the amount of the jumpers may be n, where n is greater than or equal to 1. The n jumpers may provide less than or equal to $2^n$ configurations (i.e. jumper signals), and the amount of the analyzing modules may be less than or equal to $2^n$.

Then, the logic array 26 may select one of the analyzing modules 27a and 27b according to the configuration of the jumper 28a or 28b or the jumper signal and analyze the input signal 90 to produce the decoded signal 92 by the selected analyzing module 27a or 27b.

The decoded signal 92 may be applied to the indicators 24a and 24b via a plurality of output pins. Every pin is coupled to one indicator standing for the status of a HDD. The status may be but not limited to ON/OFF, reading, or writing.

In addition, the decoded signal 92 may also be another serial signal that may be but not limited to RS232 (i.e. standard interface for serial data communication). And, the indicators 24a and 24b may comprise a control unit to convert the decoded signal 92 to a driving signal to drive the indicators 24a and 24b.

Moreover, the indicator may be but is not limited to a seven segment display, a light emitting diode (LED), or a liquid crystal display (LCD).

The aforementioned server may comprise a storage controller 32. The storage controller 32 may be coupled with the HDDs 10a and 10b and transmit the input signal 90 to the signal analyzing device 22 (i.e. the logic array 26). The storage controller may be but not limited to a serial attached small computer system interface (SCSI)) expander, Southbridge chipset, or serial advanced technology attachment (SATA) expander.

The aforementioned HDD backplane 20 may be coupled with the HDDs 10a and 10b. The jumpers 28a and 28b, the logic array 26, and the indicators 24a and 24b may be disposed on the HDD backplane 20.

The aforementioned CPU 42 may be disposed on the mother board 40. The storage controller 32 may be disposed on the interposer board 30. The interposer board 30 may be coupled between the mother board 40 and the HDD backplane 20. The storage controller 32 may be coupled between the CPU 42 and the HDDs 10a and 10b.

Figure 2:
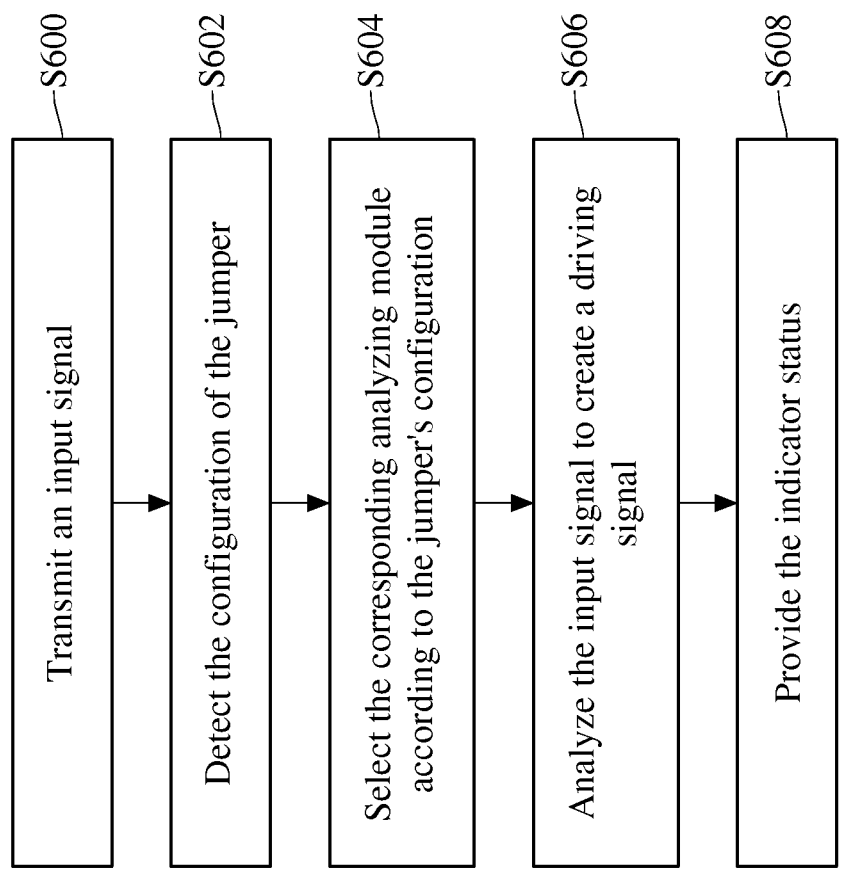
FIG. 2 is a flow chart of a signal analyzing method according to an embodiment of the present disclosure.

In order to make the persons skilled in the art have a deeper understanding about the signal analyzing device 22 of the present disclosure, the signal analyzing method is described as follows. Please refer to both FIG. 1 and FIG. 2. FIG. 2 is a flow chart of the signal analyzing method according to an embodiment of the present disclosure. According to FIG. 2, the storage controller 32 may send an input signal 90 to the logic array 26 of the analyzing device 22 in step S600. In step S602, the logic array 26 may detect the configurations of the jumpers 28a and 28b.

In step S604, the logic array 26 may select the corresponding analyzing module (e.g. the analyzing module 27a) from the analyzing modules 27a and 27b according to the configuration of the jumper 28a or 28b. In step S606, the analyzing module 27a may analyze the input signal 90 to produce the decoded signal 92 and send it to the indicators 24a and 24b. In step S608, the indicators 24a and 24b may provide the status signs in accordance with the decoded signal 92. The status sign may be the aforementioned HDD's status.

In conclusion, the present disclosure may receive input signals. Then the logic array 26 may select the corresponding analyzing module 27a or 27b according to the configuration of the jumper 28a or 28b, to analyze the input signal by the selected analyzing module 27a or 27b to produce the decoded signal 92. Therefore, the user may not need to replace the signal analyzing device 22 in response to difference input signal sets or different configurations of the server hardware.

What is claimed is:

1. A server, comprising:
    a mother board;
    a central processing unit (CPU) disposed on the mother board;
    a plurality of hard disk drives (HDDs);
    a HDD backplane coupled with the plurality of HDDs;
    an interposer board coupled to the mother board and the HDD backplane;
    at least one jumper disposed on the HDD backplane;
    a logic array coupled to the at least one jumper, disposed on the HDD backplane, comprising a plurality of analyzing modules, and configured to select one of the plurality of analyzing modules according to a configuration of the at least one jumper and receive an input signal; and the selected analyzing module configured to analyze the input signal to produce a decoded signal;
    a storage controller disposed on the interposer board, coupled to the CPU and the plurality of HDDs, and configured to transmit the input signal to the logic array; and
    a plurality of indicators disposed on the HDD backplane and configured to display working status of the plurality of HDDs according to the decoded signal.

2. The server of claim 1, wherein the storage controller is a serial attached small computer system interface (SCSI) expander, Southbridge chipset, or (serial advanced technology attachment (SATA) expander.

3. The server of claim 1, wherein an amount of the at least one jumper is n, n is greater than or equal to 1, the n jumpers include less than or equal to $2^n$ configurations, and an amount of the plurality of analyzing modules is less than or equal to $2^n$.

4. The server of claim 1, wherein an amount of the at least one jumper is n, n is greater than or equal to 1, and an amount of the plurality of analyzing modules is not larger than $2^n$.

5. The server of claim 1, wherein the logic array is a complex programmable logic device (CPLD).

6. The server of claim 1, wherein the input signal is a serial general purpose input output (SGPIO) signal.

7. The server of claim 1, wherein the decoded signal is a parallel signal.

8. A signal analyzing device, comprising:
n jumpers, wherein n is greater than or equal to 1; and
a logic array coupled to the at least one jumper, comprising a plurality of analyzing modules, and configured to receive an input signal and select one of the plurality of analyzing modules in response to the n jumpers, and the selected analyzing module configured to analyze the input signal to produce a decoded signal,
wherein the n jumpers produce less than or equal to $2^n$ sets of different jumper signals, and an amount of the plurality of analyzing modules is less than or equal to $2^n$.

9. The signal analyzing device of claim 8, wherein the logic array is a CPLD.

10. The signal analyzing device of claim 8, wherein the input signal is a SGPIO signal.

11. The signal analyzing device of claim 8, wherein the decoded signal is a parallel signal.

12. A server, comprising:
a plurality of HDDs;
n jumpers; and
a logic array coupled to the n jumpers, comprising a plurality of analyzing modules, and configured to receive an input signal and select one of the plurality of analyzing modules in response to the n jumpers, and the selected analyzing module configured to analyze the input signal to produce a decoded signal;
a plurality of indicators configured to display working status of the plurality of HDDs according to the decoded signal;
wherein n is greater than or equal to 1, the n jumpers produce less than or equal to $2^n$ sets of different jumper signals, and an amount of the plurality of analyzing modules is less than or equal to $2^n$.

13. The server of claim 12, wherein the decoded signal is a parallel signal.

14. A signal analyzing device, comprising:
n jumpers; and
a logic array coupled to the n jumpers, comprising a plurality of analyzing modules, and configured to receive an input signal and select one of the plurality of analyzing modules in response to the n jumpers, and the selected analyzing module configured to analyze the input signal to produce a decoded signal,
wherein n is greater than or equal to 1, the n jumpers have less than or equal to 2n different configurations, and an amount of the plurality of analyzing modules is less than or equal to 2n.

15. The signal analyzing device of claim 14, wherein the logic array is a CPLD.

16. The signal analyzing device of claim 14, wherein the input signal is a SGPIO signal.

17. The signal analyzing device of claim 14, wherein the decoded signal is a parallel signal.

* * * * *